United States Patent [19]

Thompson

[11] 4,287,024
[45] Sep. 1, 1981

[54] HIGH-SPEED SMOKELESS COKE OVEN BATTERY

[76] Inventor: Buster R. Thompson, Rte. No. 1, Lowes Ferry Pike, Louisville, Tenn. 37777

[21] Appl. No.: 918,054

[22] Filed: Jun. 22, 1978

[51] Int. Cl.³ .................. C10B 5/08; C10B 29/08
[52] U.S. Cl. ............................ 202/134; 202/135; 202/145; 202/151; 202/262; 202/263
[58] Field of Search ............ 202/111, 134, 135, 137, 202/145, 146, 151, 262, 263, 268; 201/15, 26, 27, 35

[56] References Cited

U.S. PATENT DOCUMENTS

| | | |
|---|---|---|
| 500,684 | 7/1893 | Westermann . |
| 537,872 | 4/1895 | Vannier . |
| 1,269,895 | 6/1918 | Zwillinger . |
| 1,635,280 | 7/1927 | Knowles et al. . |
| 2,147,827 | 2/1939 | Curran . |
| 2,148,108 | 2/1939 | Curran . |
| 2,234,174 | 3/1941 | Hughes . |
| 3,462,346 | 8/1969 | Kernan . |
| 3,592,742 | 7/1971 | Thompson et al. ............ 202/145 |
| 3,697,361 | 10/1972 | Kemmetmueller ............ 202/263 |
| 3,784,034 | 1/1974 | Thompson . |
| 3,912,597 | 10/1975 | MacDonald et al. . |
| 4,045,299 | 8/1977 | MacDonald ............ 201/15 |

Primary Examiner—Bradley Garris
Attorney, Agent, or Firm—Shanley, O'Neil and Baker

[57] ABSTRACT

A plurality of sole flue-heated, non-recovery coke ovens constructed in side-by-side relation in a battery have their chimney uptake outlets connected to a common combustion tunnel extending longitudinally of and above the battery and connected to stacks at spaced intervals along its length. Each oven has a bypass flue directly connecting the top of its coking chamber to the combustion tunnel, and a normally closed valve in each bypass is operable to selectively connect the coking chamber to the tunnel to permit charging gases to be drawn from the chambers to be burned in the tunnel and stack. The bypass valve is closed during coking so that the partially burned gases from the crown of the coking chambers are led through downcomers in the oven walls to the sole flues where a controlled amount of combustion air can be admitted to promote the continued burning process and provide maximum heat in the sole flues. The gases then pass through the chimney uptakes to the tunnel where additional combustion air can be admitted to assure complete combustion in the tunnel and stack before being discharged to the atmosphere. Combustion air admitted into the sole flues can be preheated in pipes extending through the base slab beneath the sole flues where waste heat is extracted to protect the foundation of the ovens while increasing the temperature in the sole flues.

36 Claims, 13 Drawing Figures

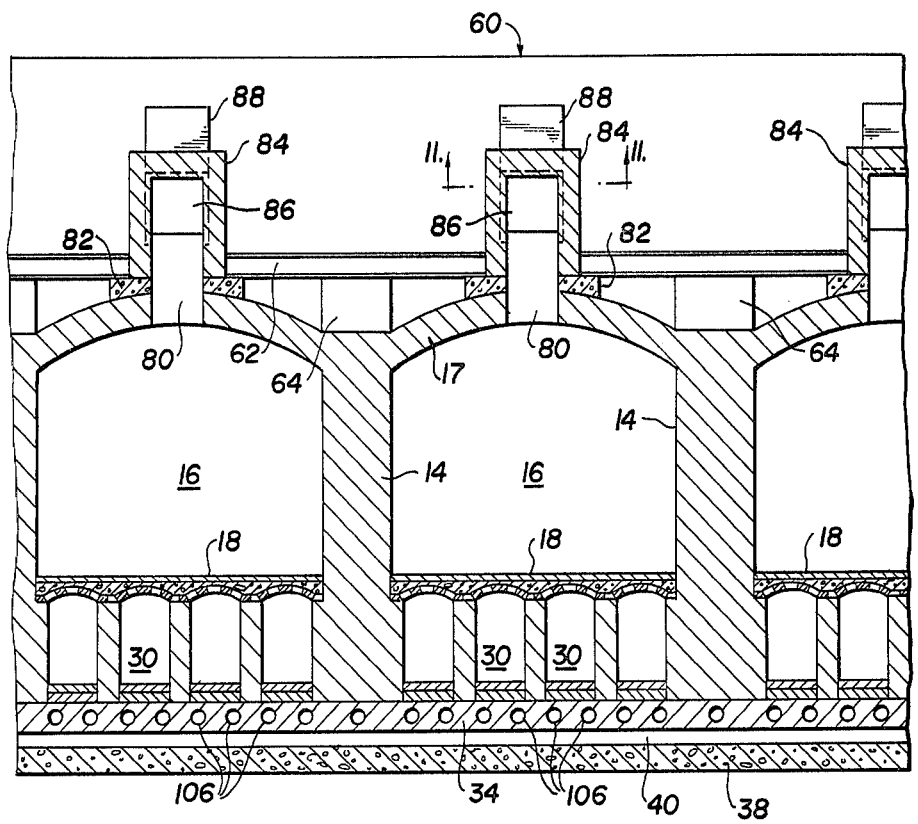
FIG.6
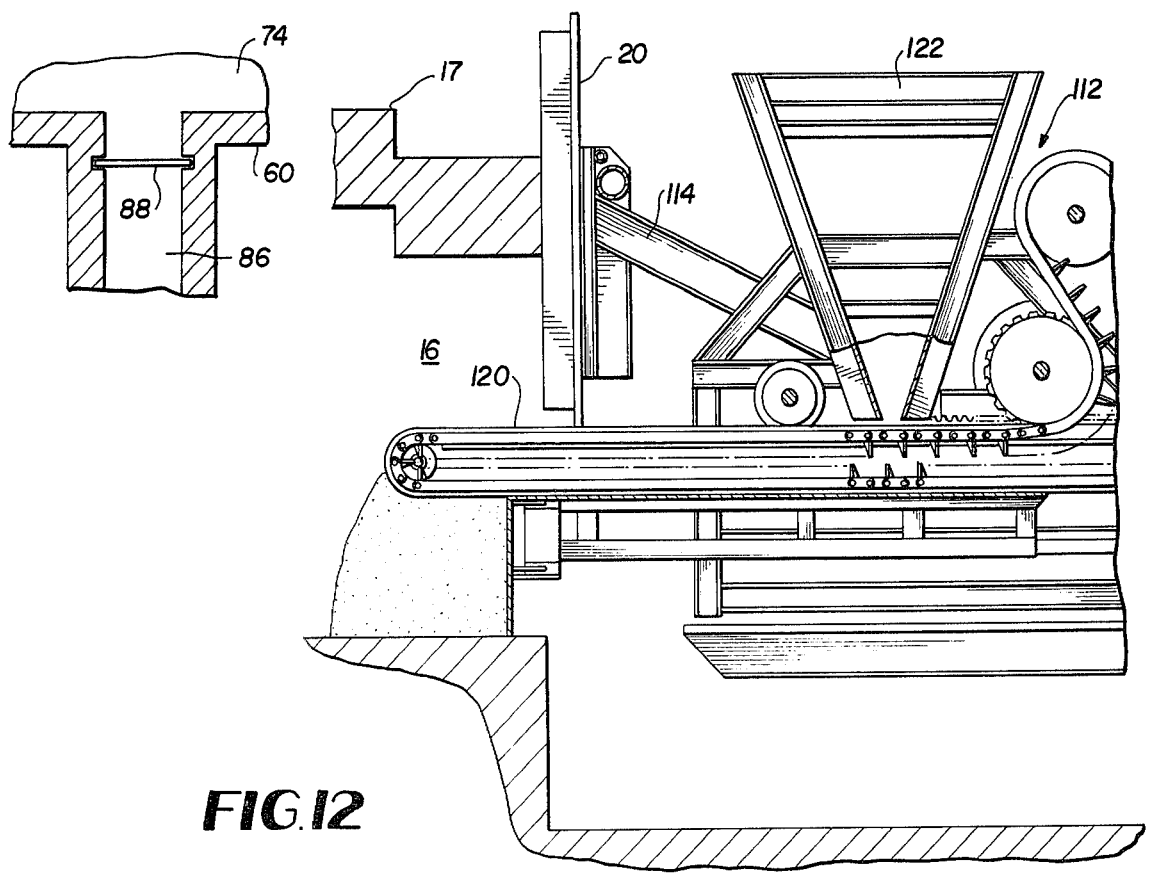
FIG.11
FIG.12

HIGH-SPEED SMOKELESS COKE OVEN BATTERY

BACKGROUND OF THE INVENTION

1. Field of the Invention

This invention relates to the high-speed, smokeless coking of coal, and more particularly to a method of and ovens for the non-recovery coking of coal in which a sufficiently high temperature and gas retention time is provided for substantially complete combustion of the volatiles and solids released during the process to assure substantially smokeless operation of the ovens without the use of auxiliary sources of heat.

2. Description of the Prior Art

The non-recovery coking process was long used, almost exclusively, for the production of metallurgical coke. This process gradually gave way to the by-product or retort process due, at least in large part, to the value of the gas and other chemicals recovered and because the actual coking process could be conducted with less polluting emissions to the atmosphere than from the non-recovery ovens then known, and therefore the by-product process could be carried out closer to the densely populated areas which provided markets for the recovered by-products. However, in recent years, the commercial market for the recovered by-products has diminished while the cost of recovery has greatly increased with the result that the economic reasons for employing the by-product process over the non-recovery process no longer exists. This has produced a renewed interest in the non-recovery process, and substantial effort has recently been directed to increasing the efficiency of non-recovery ovens and to reducing the emissions from such ovens to acceptable limits.

One source of objectionable pollution from coke ovens, whether of the by-product or non-recovery type, has been the charging gases emitted during the charging of the oven. As coal is charged into a hot oven, a surge of gas is produced due both to the displacement of gases in the furnace by the large volume of coal and to the generation of additional gases by the vaporization of moisture in the coal and the initial burning and volatization of the newly deposited coal. This surge of gas is referred to herein as charging gas to distinguish from the gases normally evolved during the coking process. The problem of eliminating emissions during charging are discussed, for example, in U.S. Pat. Nos. 4,004,702 and 3,857,758, each of which discloses apparatus intended to solve the problem and which have, at best, been only partially effective.

A particularly troublesome form of polluting emissions from non-recovery ovens has been the unburned and partially burned solids included in the stack gases admitted to the atmosphere and which are visible as smoke. The unburned and partially burned solids have been especially high during the early stages of the coking process when the chamber is largely filled with green or uncoked coal.

Various state and local agencies charged with the protection of the environment, working with the U.S. Environmental Protection Agency, have established limits on the amount of solids which may be emitted to the atmosphere from a coking oven. For example, the Commonwealth of Virginia has established a maximum average allowable solids emission of 4.1 pounds per hour from a non-recovery type coke oven coking at a rate of one ton of coal per hour. Meeting this standard requires a very substantial reduction in solids emissions over that obtainable using the technology of the known prior art non-recovery ovens.

One prior art system for reducing the solids emission from a non-recovery oven, disclosed in U.S. Pat. No. 3,462,346, employs flues or tunnels interconnecting the coking chambers of adjacent ovens in a battery. The ovens are operated in pairs, with the ovens of each pair being on alternate cycles so that, when one oven is charged with green coal, the companion oven is approximately half through the coking cycle. In operation, the partially burned products of combustion, including solid particles, or smoke, from the green coal in one chamber is passed through the companion oven, over the hot coke bed, to facilitate burning of the solids. The combined gases pass from the hot coking chamber downwardly through downcomers in the sidewalls of the oven to sole flues beneath the hot coking chamber, then outwardly through stacks. One difficulty with this arrangement is that initial coking of the green coal is very slow due to the fact that little or no heat is supplied to the sole flues of the oven beneath the green coal bed.

Another attempt at reducing or eliminating the objectionable solids or smoke from the discharge gases of a non-recovery oven is illustrated in U.S. Pat. No. 4,045,299, which discloses the use of an ignition chamber structure including a system of checkerbricks to incinerate the partially burned distillation products discharged from the sole flues of the ovens. In order to accomplish the necessary reduction in emissions, using this prior art arrangement, it is necessary to provide an independent oil-fired burner arrangement in the ignition chamber to provide the required heat, and to supply an auxiliary draft inducing means, or fan, to draw the gases from the ignition chamber. In addition, a liquid scrubber is required for the stack.

Numerous other attempts have been made to reduce or eliminate the pollution previously thought inherent in a coking operation but, as with those discussed above, have only met with limited success. It is, therefore, a primary object of the present invention to provide an improved, high-speed, non-recovery type coking installation wherein the distillation products liberated and solid combustible materials released in a coking chamber are so completely burned before being discharged into the atmosphere as to substantially reduce the polluting emissions discharged.

It is a further object of the present invention to provide such a high-speed coking oven which is self-sustaining, requiring no auxiliary heat or fuel to complete combustion of the distillation and solid products liberated in the coking chamber.

Another object of the invention is to provide such an oven in which heat is supplied to the coking chamber through sole flues extending beneath the oven floor in which the products of distillation are burned and in which preheated combustion air is supplied to the sole flues to thereby increase the temperature in the flues.

Another object of the invention is to provide an improved high-speed smokeless non-recovery coking oven including improved means for reducing discharge of charging gases into the atmosphere during charging of the oven.

SUMMARY OF THE INVENTION

In the attainment of the foregoing and other objects and advantages, one feature of the invention resides in providing a plurality of sole flue-heated, non-recovery ovens constructed in side-by-side relation in a battery with downcomers constructed in the walls between adjacent ovens connecting the crown portion of the coking chamber, i.e., the open space above the charge of coal being coked, with the sole flues beneath the chamber. Chimney uptakes extending through the walls between adjacent ovens have their outlets connected to an elongated combustion tunnel, constructed of refractory material, which extends longitudinally of the battery and which discharges into the base of stacks extending above the top of the battery at spaced intervals along its length. A plurality of adjacent ovens are connected in the common tunnel between the respective stacks so that the exhaust gases from a plurality of ovens are mixed within the tunnel for complete burning before being discharged into the atmosphere at the top of the stacks. Combustion air, as required, is admitted into the tunnel to assure substantially complete burning of combustible products which reach the tunnel from the sole flues.

Another feature of the invention enables the combustion of charging gases in the tunnel and stack, thereby substantially reducing the pollution during charging of the oven. This is accomplished by providing a bypass flue from the top of the respective ovens to the tunnel, with a valve in each bypass being selectively operable to directly connect the oven chamber with the tunnel during the charging operation, and to prevent the flow of gases through the bypass during the coking process.

An increased temperature is achieved in the sole flues, and therefore throughout the system, by preheating to a relatively high temperature the combustion air supplied to the sole flues. This is accomplished, without requiring the use of any forced air system, by providing a plurality of cooling pipes extending through the base slab beneath the sole flues, and connecting the pipes to a common manifold which is connected, through a suitable flow controller, to the sole flues. The draft within the sole flues creates a suction which draws air through the pipe system to extract heat from the base structure and preheat the air before it enters the flues. Preheating the combustion air in this manner serves the important function of cooling the foundation and preventing heat shrinkage of the earth beneath the battery which can result in settling, cracking, or other damage to the system.

Another novel feature of the coking oven system according to the present invention resides in the arrangement of the sole flues to provide two separate, independent flue systems beneath each oven to thereby provide a substantially uniform temperature throughout the floor of a large oven. Separate combustion air supply systems, draft controls, and the like can be provided for the respective sole flue systems in each oven to assure uniform heating throughout the oven.

BRIEF DESCRIPTION OF THE DRAWINGS

The foregoing and other objects and advantages of the present invention will become more apparent from the following detailed description, taken in conjunction with the drawings, in which:

FIG. 6 is an enlarged, fragmentary vertical sectional view taken on line 6—6 of FIG. 2;

FIG. 11 is an enlarged, fragmentary sectional view taken on line 11—11 of FIG. 6;

FIG. 12 is an enlarged view of a portion of the structure shown in FIG. 2 and showing the procedure for charging the oven; and FIG. 13 is an end elevation view of one of the oven doors.

DESCRIPTION OF THE PREFERRED EMBODIMENTS

Figure 1:
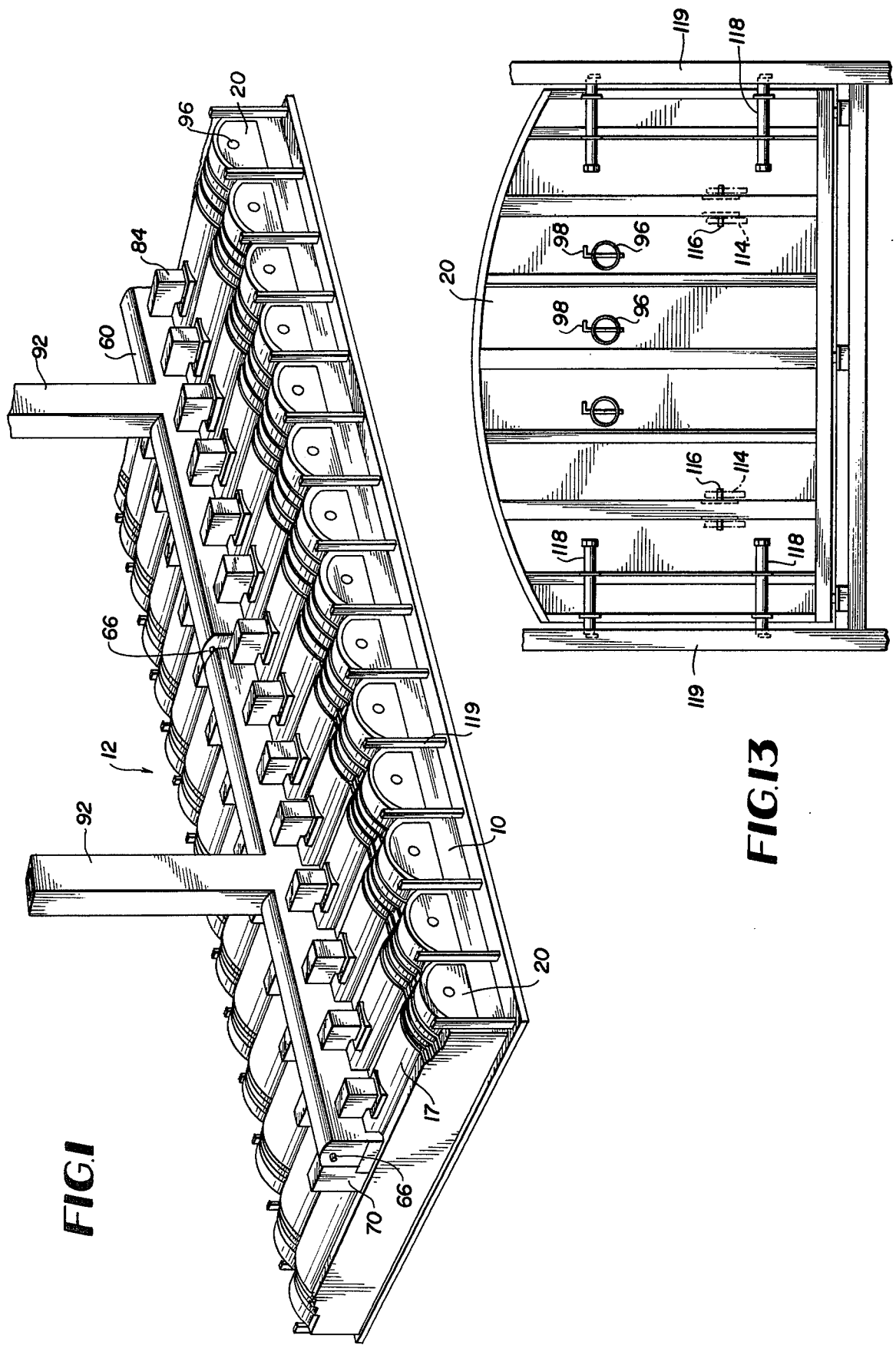
FIG. 1 is an isometric view of a portion of a battery of coke ovens embodying the invention.

A coal coking plant embodying the present invention is illustrated in the drawings as including a plurality of coke ovens 10 constructed in side-by-side relation in a battery 12, with the adjacent ovens in the battery having common sidewalls 14. The individual ovens 10 in the battery each have an elongated coking chamber 16 defined by the opposed vertically extending sidewalls 14, a generally arcuate roof 17 supported on the sidewalls 14, and a horizontal floor 18 which supports the charge of coal to be coked. The ovens are constructed with the opposed ends of the chamber open, and the ends are closed during the coking process by removable doors 20, 22, with door 20 closing the charging end and door 22 closing the coke end of the chamber. The sidewalls 14, roof 17, and floor 18 are formed from a suitable heat resistant material such as refractory brick or castable refractory material capable of withstanding the high temperatures encountered in the coking process and the thermal shock resulting from the deposit of fresh charges of coal in the heated oven chambers.

Figure 4:
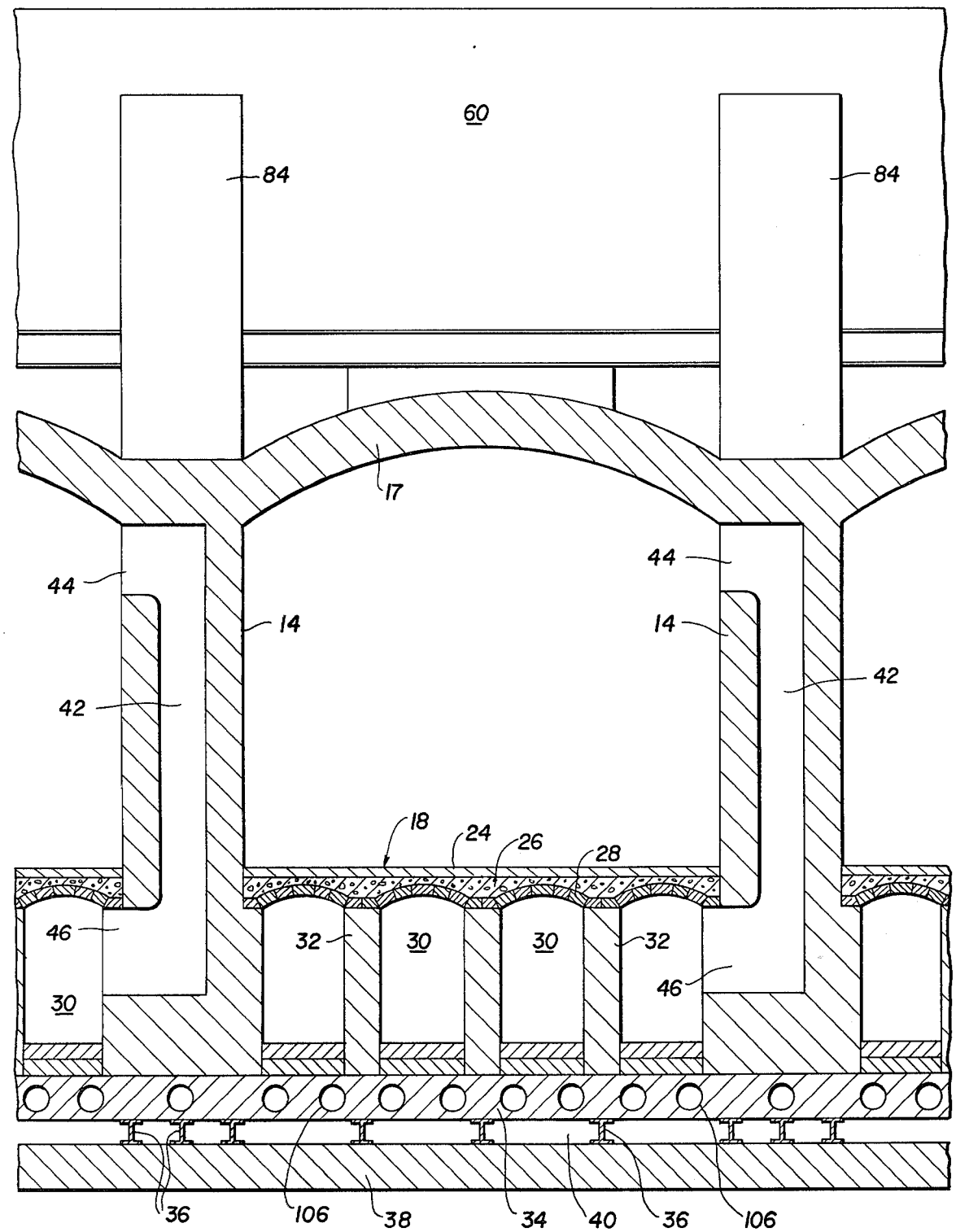
FIG. 4 is an enlarged, fragmentary vertical sectional view taken on line 4—4 of FIG. 2.
Figure 5:
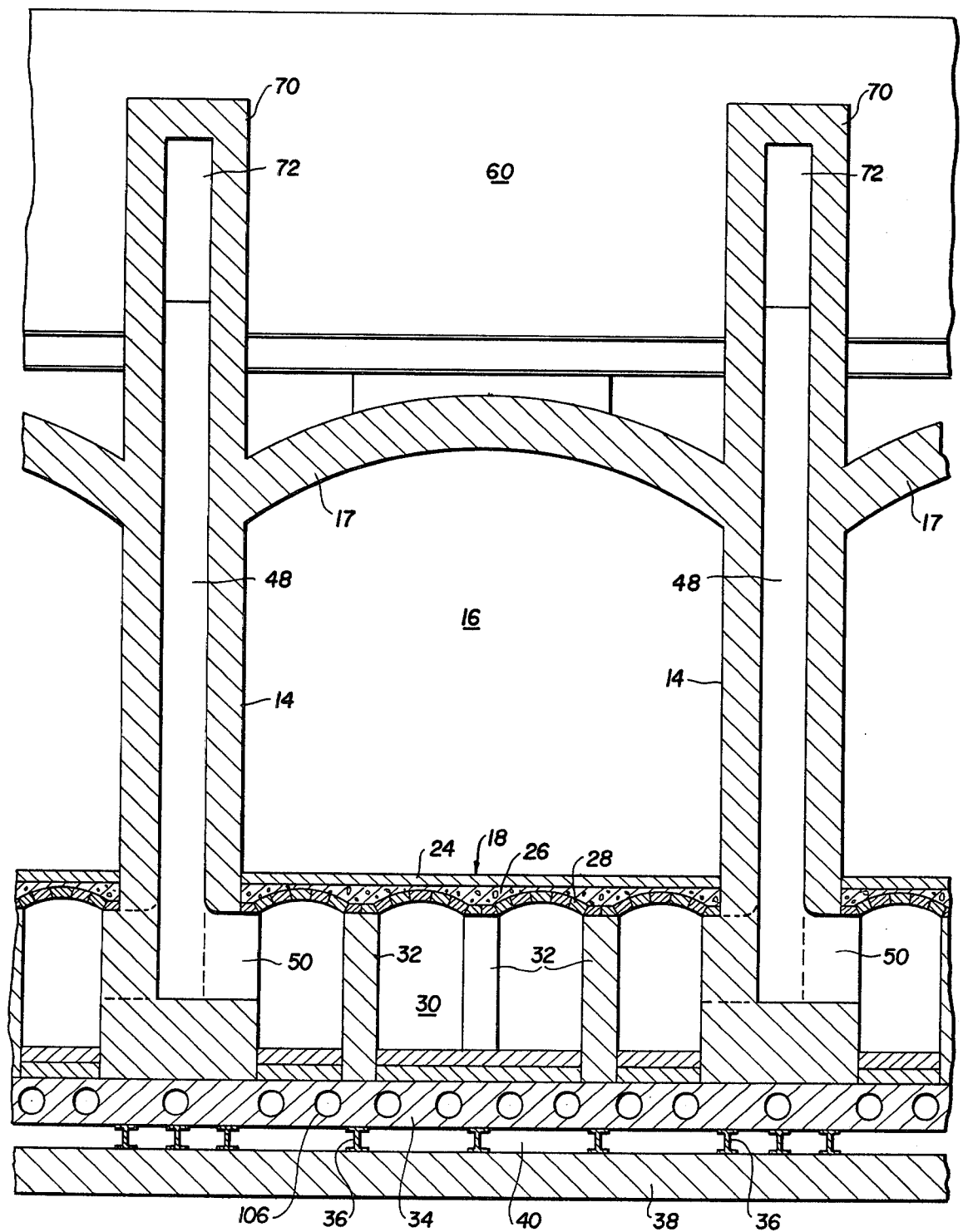
FIG. 5 is an enlarged, fragmentary vertical sectional view taken on line 5—5 of FIG. 2.
Figure 7:
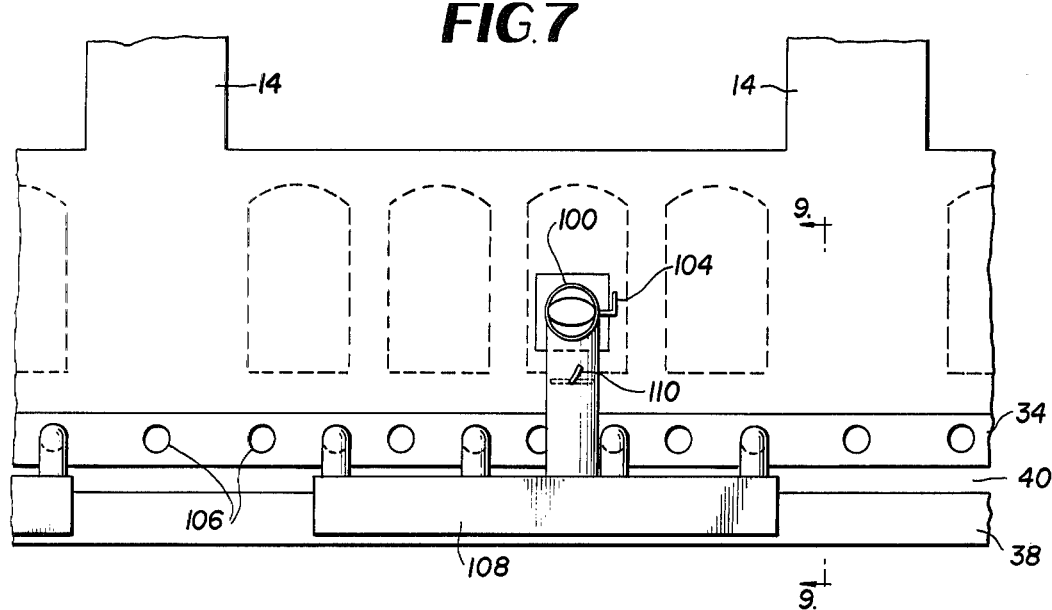
FIG. 7 is an enlarged fragmentary, front elevation view of a portion of the battery shown in FIG. 1 and showing the sole flue combustion air supply system on the charging side of the ovens.
Figure 8:
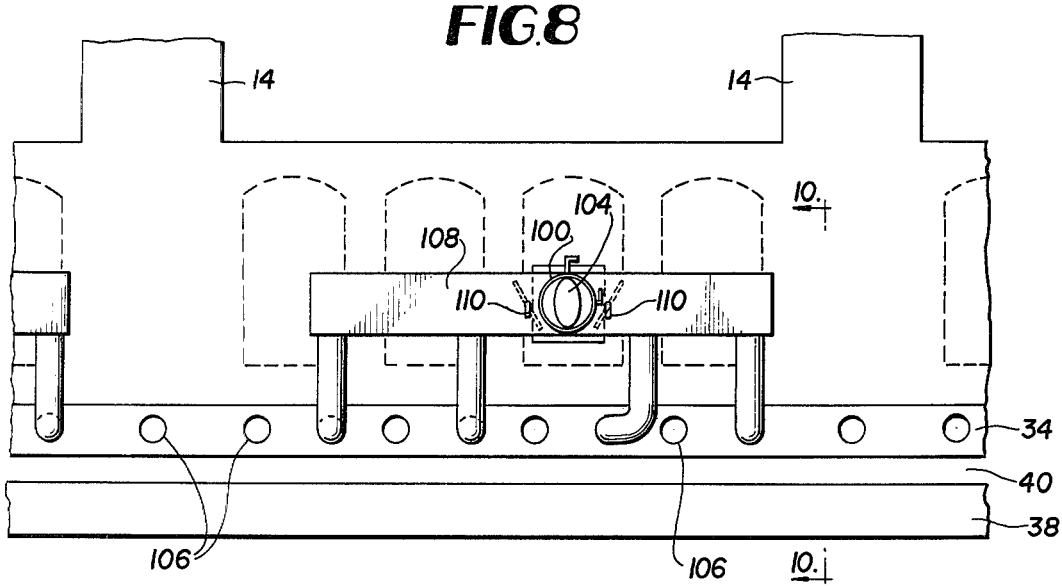
FIG. 8 is a view similar to FIG. 7 and showing the sole flue combustion and supply system or the coke side of the ovens.
Figure 9:
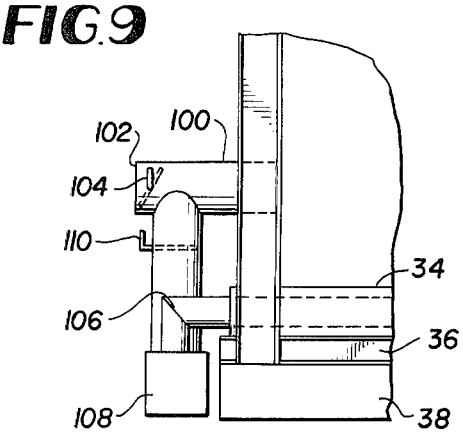
FIG. 9 is a fragmentary, sectional view taken on line 9—9 of FIG. 7.
Figure 10:
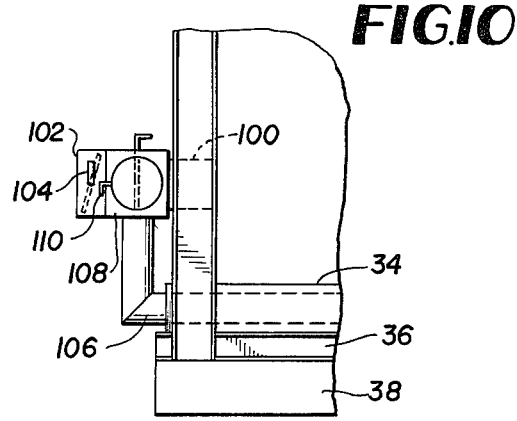
FIG. 10 is a fragmentary, sectional view taken on line 10—10 of FIG. 8.

As best seen in FIGS. 4 and 5, the floor 18 preferably consists of a top layer 24 of refractory brick resting upon a bed 26 of castable refractory material which is cast over the brick arch tops 28 of a system of elongated, generally rectangular sole flues 30 extending beneath each oven chamber 16. The arches 28 are supported by the sidewalls 14 and by a plurality of parallel intermediate refractory brick walls 32, with the sidewalls 14 and the walls 32 cooperating to define the elongated sole flues 30.

The battery 12 of coke ovens is constructed on a continuous base slab 34 formed of a castable refractory material and supported at spaced intervals along the length of the battery by a plurality of wide-flange structural steel beams 36 extending transversly of the battery and generally parallel to the walls 14 and 32. Beams 36 are, in turn, supported on a rigid foundation slab 38 of reinforced concrete material. Thus, the beams 36 support the oven structure in upwardly spaced relation to the slab, with the space 40 between the refractory base slab 34 and the concrete foundation slab 38 being open to the atmosphere at each end of the beams 36 along the full length of the battery of ovens. This open space 40 provides an effective insulation or heat barrier substantially reducing the transfer of heat from the refractory base slab 36 to the foundation and to the earth beneath the foundation, thereby both protecting the foundation slab against the adverse effects of the heat and reducing the heat shrinkage of the earth beneath the foundation.

A plurality of vertically extending downcomers, or channels 42 are formed in the sidewalls 14, with the respective downcomers 42 having an inlet 44 leading from the top or crown portion of the respective oven chambers 16 and an outlet 46 leading into the sole flue tunnel 30 adjacent the sidewall 14 in which the downcomer is formed. A pair of uptakes, or chimneys 48, are also formed in each of the common walls 14, with each chimney having an inlet 50 in its base leading from the adjacent sole flue tunnel 30. The chimneys extend upwardly through the walls 14 to a point spaced above the roof 17 as more fully described hereinbelow.

Figure 3:
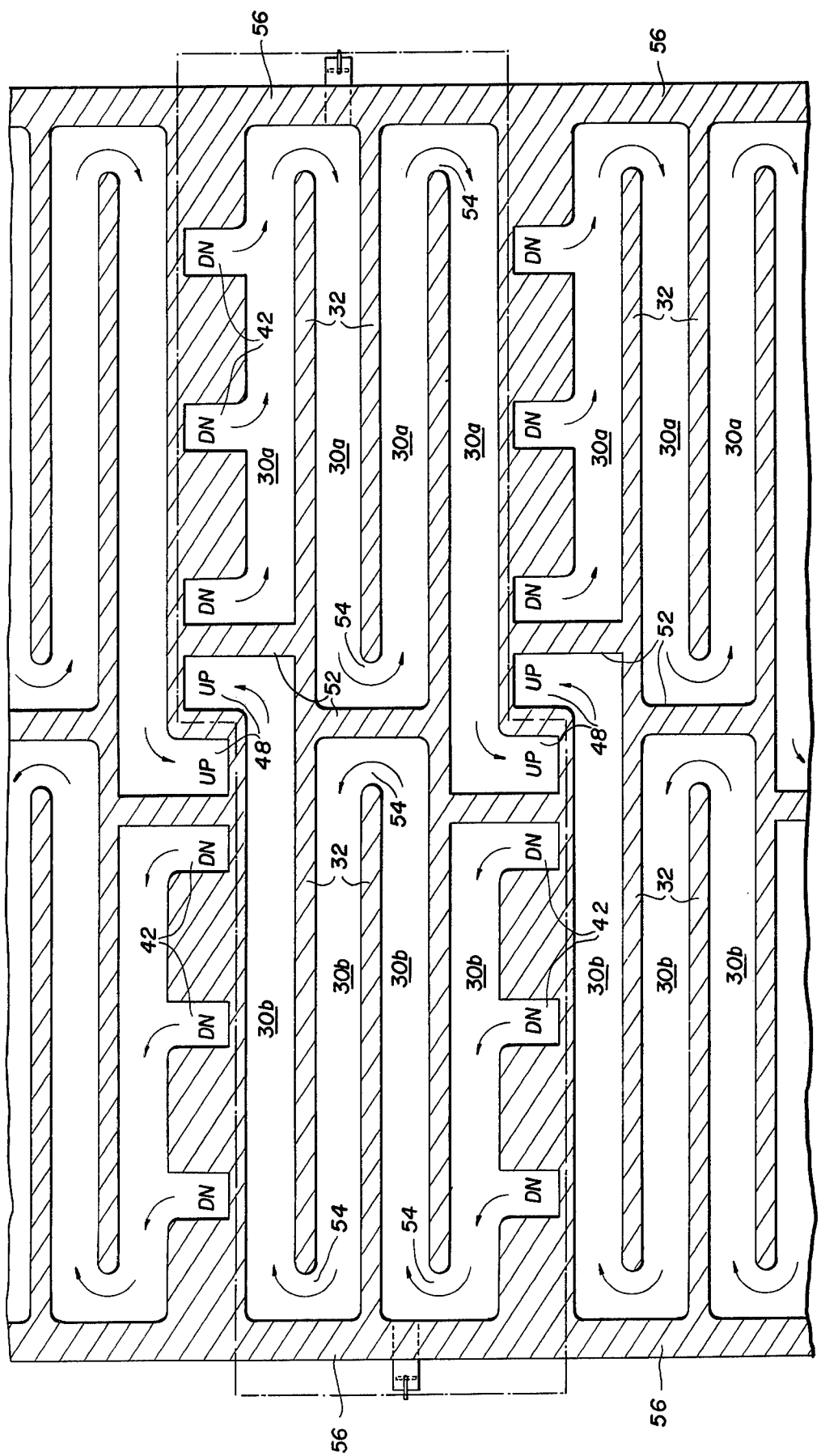
FIG. 3 is an enlarged fragmentary sectional view, taken on line 3—3 of FIG. 2, showing the sole flue system of the ovens.

The downcomers 42, sole flues 30, and uptakes 48 associated with each oven 10 are arranged in two separate sole flue heating systems as illustrated in FIG. 3. Thus, the structure enclosed within the broken line in FIG. 3 constitutes the sole flue heating systems for a single oven 10, with the sole flue systems to either side of the area enclosed by the broken line being associated with adjacent ovens in the battery. As shown, each sidewall 14 is formed with 6 downcomers and 2 uptakes located adjacent one another, one on each side of the longitudinal center of the battery and with three downcomers located in each end portion of the wall outboard of the uptakes. A series of divider walls 52 extend perpendicular to the intermediate walls 32 and divide the respective sole flues 30 into sections 30A and 30B isolated from one another on opposite ends of the oven. Adjacent sole flue sections 30A are interconnected at alternate ends thereof by crossover openings 54 in the walls 32 to provide a continuous back-and-forth gas flow pattern across essentially the full width of the oven at one end thereof, and the adjacent sole flue sections 30B are interconnected at opposite ends by similar crossovers 54 to provide a continuous back-and-forth gas flow pattern across the other end of the oven.

The downcomers 42 located in one end of walls 14 all have their inlets 44 and outlets 46 facing in one direction longitudinally of the battery to connect the crown of an oven on one side of the respective walls with the sole flue section 30A beneath that oven while the inlets 44 and outlets 46 of the downcomers into the other end of the walls face in the opposite direction to connect the crown and sole flue sections 30B of the oven on the opposite side of the respective walls 14. Similarly, the uptakes in each wall 14 have their inlets opening in opposite directions so that one is in communication with a sole flue section 30A beneath one oven and the other uptake is in communication with a sole flue section 30B beneath an adjacent oven. Thus, in the sole flue system for a single oven enclosed within the broken line in FIG. 3, gas flows from the crown portion of an oven chamber 16 through the three downcomers 42 in the right-hand end of the upper wall 14, i.e., the wall 14 illustrated in the upper portion of FIG. 3, into a sole flue segment 30A then through the sole flue system across the width of the oven and out through a chimney uptake in the lower wall 14 and located to the left of the battery center line. Similarly, downcomers in the left end of the lower wall 14 provide a gas flow pattern from the crown portion of the oven into the sole flue section 30B to flow in a back-and-forth pattern transversely across the oven to exit through a chimney uptake in the upper sidewall, so that the flow patterns transversely of the oven are in opposite directions on opposite ends of the oven. End walls 56 extend below doors 20, 22 to close the sole flue systems along the sides of the battery.

Figure 2:
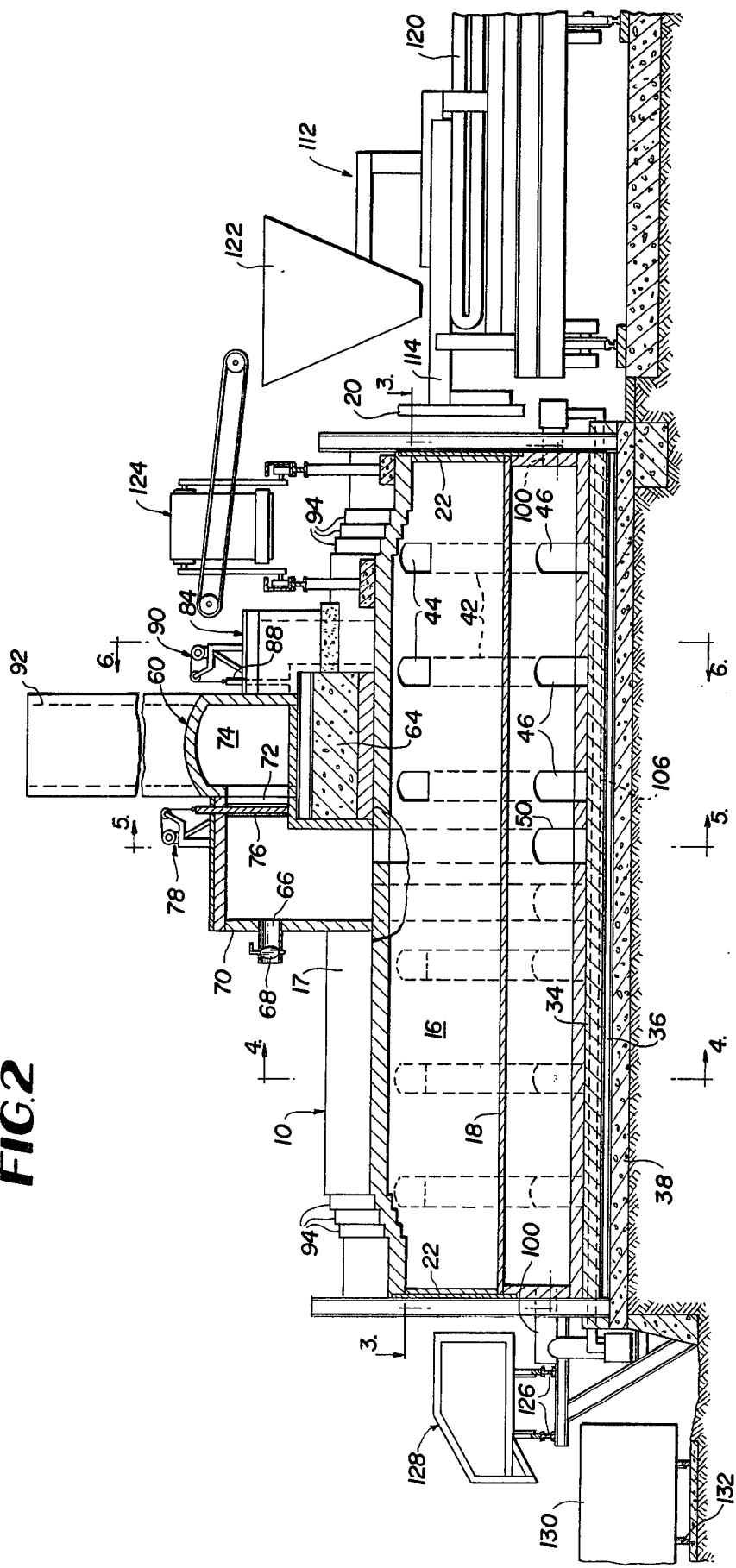
FIG. 2 is a longitudinal vertical sectional view of one of the ovens in the battery and showing the means for charging and pushing the oven.

As best seen in FIGS. 1 and 2, a plurality of elongated combustion tunnels 60 extend above the arcuate roofs 17 of ovens 10 throughout essentially the full length of the battery with each tunnel preferably extending over a group of eight adjacent ovens. The tunnels 60 are constructed of refractory brick or other suitable high temperature resistant material and are supported on steel beams 62, which, in turn, are supported on upstanding blocks, or columns 64 supported on the top of each of the sidewalls 14. The blocks 64 may be formed of any suitable load-bearing material such as concrete or refractory brick. Combustion air inlets 66, each including a suitable flow regulating valve 68, are provided at the ends of each tunnel section and in chimney extensions 70 to admit air to support combustion of gases in the tunnel.

A substantially right-angled chimney extension or elbow 70 is supported on the top of each sidewall 14 adjacent the tunnel support blocks 64, with the uptakes 48 in the respective walls 14 discharging into the interior of the chimney extension. The chimney extension 70, in turn, has an outlet 72 in direct fluid communication with the longitudinally extending interior channel 74 of the tunnel structure 60. Chimney extension 70 is formed from refractory brick or other suitable material capable of withstanding the intense heat of the gas from the sole flues. A vertically moveable refractory panel 76 can be mounted in each extension 70 for movement between a lowered position shown in FIG. 2 closing the chimney extension at the tunnel and a raised position opening the tunnel for direct fluid communication between the uptakes and outlet 72 into the tunnel. Such refractory panel valve structure would normally be maintained in the raised, fully opened, position and would be closed only in the event of an oven being closed, or taken out of operation as for repairs while other ovens in the battery are in operation. Any suitable means, such as a portable hoist 78, may be employed to raise and lower the refractory panel valve 76.

The chimney uptakes 48 are located near the center of the sidewalls, with the elongated tunnel 60 and tunnel support structure being positioned forwardly of the chimney extensions 70, i.e., between the uptakes and the charging end of the ovens. A charging gas bypass opening 80 is formed in the roof of each oven forwardly of the tunnel structure 60, and a reinforced support pad 82, formed from a suitable refractory or concrete material, is cast upon the top surface of the respective roofs 17 surrounding each opening 80. Support pads 82 each support an elbow-shaped flue 84 connected to the tunnel 60 and having an open channel 86 providing communication between the bypass opening 80 and extending into the interior channel 74 of the tunnel 60. The flue structure 84 is formed from a suitable heat resistant refractory material to enable it to withstand the intense heat encountered during operation of the oven. A refractory valve plate 88 is supported within a guide slot in the top wall of flue 84 and extends into the flue opening 86. Plate 88 is supported for vertical movement between a closed position shown in FIG. 6 completely closing the bypass from the oven to the tunnel and an open position in which the valve 88 is raised providing a direct gas flow path through the bypass opening 80 to the combustion tunnel. Valve member 88 can be opened by any suitable means such as the hoist 90 shown in FIG. 2.

Valve 88 is normally maintained in the lowered position shown in FIG. 6 during the coking operation, and is raised to the open position only during the charging operation to permit charging gases to be drawn directly from the crown of the oven being charged into the combustion tunnel to be mixed with the hot gases from the sole flues of adjacent ovens for complete burning before being discharged to the atmosphere.

Gases from the interior channels 74 of the combustion tunnel 60 are discharged to the atmosphere at the top of vertically extending stacks 92 which are in direct fluid communication with the combustion tunnel at the base of the stacks. Stacks 92 are constructed at spaced intervals along the length of the tunnel 60, with a plurality of individual ovens being located between adjacent stacks so that the sole flue gases and charging gases from a plurality of ovens are discharged into and combined within the combustion tunnel between adjacent stacks. In order to assure complete mixing and combustion of the gases, each stack should serve at least six and preferably eight individual ovens. The stacks 92 are supported on the top of the tunnel 60, directly above one of the sidewalls 14 of the ovens, with the base of the stacks opening directly into the open channel 74 of the combustion tunnel.

As best seen in FIGS. 1 and 2, the arcuate roofs 17 of the respective ovens are higher in the central portion of the oven than at the ends. This is accomplished by a series of steps 94 formed in the roof adjacent each end of the oven. This construction provides additional space in the crown of the ovens above a bed of coal being coked while permitting the use of smaller door assemblies which, as is known, are extremely heavy, difficult to handle, and expensive to build. This is particularly true in the case of the large ovens of the type contemplated by the present invention wherein the door assembly may have a width of up to 11½ feet, or more, and a total height of 8 feet or more, even with the step-down roof construction. In order to provide the necessary strength and to avoid temperature warping, the doors must be constructed of very heavy structural steel plate and beams and have a thick lining of castable refractory material on their inner surface as is well-known in the art. One or more air inlet openings 96, each including a damper valve 98 for controlling the flow of air therethrough, are provided in the doors 20, 22 to permit the admission of a controlled amount of combustion air into the crown of the respective oven chambers 16.

Air is also supplied to the combustible gases in the sole flues to promote burning and increase the temperature beneath the oven chambers. The air is admitted into each of the sole flue systems 30A and 30B through supply pipes 100 extending through the walls 56 at each end of the respective ovens. Supply pipes 100 have an inlet end 102 open to the atmosphere and a suitable damper means such as the manually operable butterfly valve 104 is provided in each supply pipe to control the flow of ambient air into the respective sole flue systems.

It has been found that preheating the combustion air supplied to the sole flues can materially increase the temperature in the coking chamber and throughout the entire gas flow system. To accomplish this, a plurality of pipes 106 are cast in the base slab 34 beneath each oven 10, with the pipes 106 extending generally parallel to the longitudinal axes of the ovens completely through the base slab. At least a portion of the pipes 106 have one end open to atmosphere and their other end connected to a manifold 108 which in turn is connected to supply pipes 100. As shown in FIGS. 2 and 7-10, alternate pipes 106 along the length of the battery beneath each oven are connected to a manifold 108 located at the charging end of the associated oven while the remaining pipes 106 beneath that oven are connected to a manifold 108 located at the coke end of the oven. Additional pipes 106 may be cast in the base slab 34, e.g., beneath the walls 14, with these additional pipes having both ends open to atmosphere.

The respective manifolds 108 are connected to the supply pipe 100 serving the sole flue systems 30A, 30B of the associated oven at a point between the damper valve 104 and the wall 56. Damper valves 110 are mounted in the manifold 108 to control the flow of heated air from the manifold into the supply pipes 100.

The draft, or reduced pressure, in the respective sole flue systems 30A and 30B, will cause air to be drawn through the pipes 106 and manifolds 108 into the system. Air flowing through the pipes 106 will be preheated before entering the sole flues by absorbing heat from the base slab 34, thereby cooling the slab. This serves the important function of further reducing the amount of heat reaching the foundation slab 38 and the supporting earth beneath the structure to avoid excessive earth shrinkage and settling from heat and drying. The amount of air drawn through the pipes 106, and consequently the temperature of the air (within limits) can be controlled by the damper valves in the respective manifolds and in the associated air supply pipe. It is apparent that the damper valves may be positioned to supply all ambient air, all preheated air from the pipes 106 and manifolds 108, or a mixture of ambient and preheated air to the flues.

While the combustion air flow into the sole flue systems, as well as into the crown of the ovens and into the combustion tunnel, is illustrated as being controlled or regulated by manually actuated damper valves, it is contemplated that such air flow be automatically regulated. For example, the gas temperature or gas flow velocity at critical or representative points along the gas flow path may be employed to control energization of suitable drive means to automatically position the various air flow control valves.

Ovens according to the present invention are preferably charged through the front door by use of a pushing and charging machine of the type disclosed in my prior U.S. Pat. No. 3,784,034. Such a charging machine, designated generally by the reference numeral 112 in FIGS. 2 and 12, runs on rails extending parallel to and in front of the battery of ovens. A door handling assembly 114 on the machine is adapted to project forwardly and engage lifting bars 116 on the front of the oven door to support the door during the charging and pushing operation. To charge the oven, cam locks 118 are disengaged from the back stop 119, and the door is withdrawn and elevated to a position with the bottom of the door spaced substantially above the floor 18 of the associated oven. Thereafter, a drag type conveyor assembly 120 on the charging machine is projected into the oven, as shown in FIG. 12, and the door handling assembly is actuated to lower the door 20 to position with its bottom edge directly above the drag conveyor and with the inner surface of the door flush against the front of the oven to effectively seal the open end of the oven above the drag conveyor. Coal to be coked is then fed from a hopper 122 onto the conveyor 120 which conveys the coal into the oven, filling the oven to the desired depth from the front progressively to the door 22 at the coke end of the oven.

During the charging operation, valve 88 is open so that charging gas generated in the oven flows directly through the bypass opening 80 and the flue opening 86 into the combustion tunnel. The draft created by the stacks, in combination with the aspiration effect of the high velocity gases flowing in the combustion tunnel, draws the charging gas from the oven where it is mixed with and burned by the hot gases from other ovens flowing in the combustion tunnel and stack. This draft through the bypass opening, in combination with the effective blocking of the door opening by the charging machine and oven door, substantially eliminates the escape of charging gases through the open door into the atmosphere, thereby avoiding any serious air pollution problem during charging. Limiting the amount of air entering the oven chamber by effectively sealing the open end of the oven during charging enables the bypass to handle the entire flow of charging gas. Tests have shown that this system will produce a slight draft into the oven around the charging conveyor and door which effectively prevents the escape of substantial quantities of charging gas.

Coal can be continuously fed to the hopper 122 by a driven belt conveyor mechanism 124 supported on and extending substantially the full length of the battery of ovens adjacent the front or charging end of the individual ovens.

When an oven is completely charged, the drag conveyor 120 is withdrawn leaving the charge of coal in a level, compacted condition as described in my above-mentioned patent. As soon as the conveyor is retracted, the door 20 is lowered and secured in position sealing the oven as shown in FIG. 2. Due to the draft in the flue system, a slight negative pressure is immediately created in the crown of the charged oven as soon as the door is secured, so that there is no tendency for oven gases to escape around the door during the coking process. Also, by charging the ovens through the door, the usual charging holes in the oven roof can be eliminated, thereby avoiding another well-known source of air pollution commonly encountered in conventional coking installations.

After the coking operation is completed, door 22 is removed by a conventional door machine (not shown) running on tracks 126, extending along the coke side of the battery. A guide car 128 is then moved into position in alignment with the open end of the oven to guide the coke pushed from the oven into a hot coke car 130 supported on rails 132 extending along the battery below the level of the oven floor. As the coke guide is moved into position, a door handling apparatus on the charging apparatus 112 removes the door 20 and a ram is projected into the oven to push the cake of incandescent coke through the open end of the oven at the coke side of the battery as disclosed in my above-identified patent. The incandescent coke is then moved, in the hot coke car 130, to a quenching station (not shown) where water is dumped onto the coke for quenching. The door machine and coke guide, as well as the hot car, can be of conventional construction.

Experimental ovens of the type described above have been constructed, with the oven chambers having an internal width of 11 feet and a length, between doors, of 50 feet 6 inches. With a charging machine of the type described, the oven chamber can be charged to a depth of 30 inches and the door replaced to seal the oven in less than four minutes so that the bypass from the oven crown to the combustion tunnel can remain open for only a very short time. The complete charging operation, from the time that a cake of incandescent coke is pushed from an oven until the oven is charged and sealed, including the time required to position the charging machine, can be completed in less than eight minutes. As soon as the oven is sealed, the valve panel is lowered, closing the bypass to compel all of the gases generated in the oven to be drawn through the downcomers to the sole flues then out through the uptakes and combustion tunnel to the nearest stack.

In operation of the experimental ovens mentioned above it has been found that an increased coking rate from the bottom of a charge of coal can be obtained by closing the oven for a few minutes after completion of the pushing operation and before recharging the chamber. It is believed that this enables the intense heat from the crown portion of the oven structure to radiate downwardly to increase the temperature of the floor of the oven during this brief interval so that the coking process commences more quickly and therefore progresses at an increased rate from the bottom of the new or green charge.

The increased oven temperatures obtained in accordance with this invention can result in a coking rate of 1¼" per hour or greater so that a 30" charge of coal can be coked in a 24 hour cycle. Further, the coking operation is extremely efficient in that the volatiles are driven off by the intense heat within the controlled atmosphere of the oven without excessive burning of the charge. For example, charges of 25 tons of green coal have been coked in an oven according to the present invention producing 18 tons of coke. This is a yield of 72% by weight.

The intense heat in the oven chamber results in a new charge of coal igniting almost instantly, upon withdrawal of the charging conveyor. Closing the charging end door and closing the bypass valve 88 immediately directs the evolved gases through the downcomers to the sole flue systems where combustion of the gases supplies heat through the floor of the oven chamber to increase the temperature in the coking chamber and thereby increase the coking rate.

Experiments have determined that combustion air can be supplied to the sole flues at a temperature of from 400° to 600° F. by employing the preheating system described. The final temperature of the air entering the sole flues depends to some extent on ambient conditions and the amount of ambient air mixed with the preheated air. During operation of the ovens, the pressure in the sole flues is normally within the range of 0.2 to 0.3 in. $H_2O$ below atmosphere. This pressure produces a relatively high gas velocity through the flues and draws air through the pipes 106 to preheat the combustion air and cool the base slab 34. This draft also extends to the crown of the oven, drawing the gases from the crown into the downcomers and drawing a controlled amount of combustion air through the openings 96 in the doors.

The experimental ovens described above are constructed with sole flue systems including four side-by-side tunnels beneath each oven chamber, with the individual tunnels each being 2 feet wide and 3 feet high at the side edges of the arched tunnel top. Tests conducted on these ovens show that the temperature in the sole flues may range between 2350° F. and 2550° F. and the gas velocity flowing through the flues may range between 600 and 1000 fpm. Under these conditions, the temperature in the crown of the oven has been determined to be within the range of 2400° F. to 2550° F. and the temperature in the combustion tunnel within the range of 1800° F. to 1900° F. It has also been determined that preheating the combustion air admitted to the sole flues, in the manner described, not only increases the temperature in the sole flues and combustion tunnel by up to 200° F., but surprisingly also results in the increasing temperature in the crown of the oven and throughout the system by substantially the same amount.

The high temperature maintained in the combustion tunnel, combined with the retention time of the gases in the combustion tunnel and the stack, enables the substantially complete burning of combustible gases and particulates before being discharged into the atmosphere. By discharging the uptakes of a number of ovens into the combustion tunnel between the stacks, substantial turbulence can be imparted to the gases flowing through the tunnel. This turbulence, together with the high temperature in the tunnel and an excess of combustion air, facilitates the complete burning of combustibles from all ovens regardless of their location along the tunnel relative to the stacks, and regardless of whether coking gases or charging gases are being discharged into the tunnel from any particular oven.

While tests have indicated that ovens according to the present invention can be operated with atmospheric emission substantially below the current requirements, it is also contemplated that even greater combustion efficiency could be achieved in the combustion tunnel by installing a system of checker-bricks, or even a catalytic structure, within the combustion tunnel. However, such structure would have the tendency of reducing the draft in the system and could require taller stacks to maintain the necessary draft. Tests indicated, however, that the minor gains in combustion efficiency obtainable from such structure in the combustion tunnel and/or stack may not be necessary or justified. For example, the large experimental ovens described have been operated with an average solids emission of less than 2.4 pounds per hour, over a 24 hour coking cycle, or 1.7 pounds per hour below the level allowed by the Commonwealth of Virginia for ovens of approximately half the capacity. No visible difference can be detected in the smoke, or solids emissions, between operation of the system with and without checker-bricks in the combustion tunnel.

It is believed apparent that various modifications might be made in the structure described without departing from the invention. For example, while a plurality of combustion tunnels are illustrated, a single, continuous structure could be employed, with internal walls of refractory material dividing the interior of the tunnel into separate sections each communicating with a stack. Similarly, it is believed apparent that opposed-flow sole flue systems might be used with other oven structures, as could the combustion tunnel and gas bypass system. Thus, while I have disclosed and described a preferred embodiment of my invention, I wish it understood that I do not intend to be restricted solely thereto, but rather that I do intend to include all embodiments thereof which would be apparent to one skilled in the art and which come within the spirit and scope of my invention.

I claim:

1. A battery of nonrecovery coke ovens comprising, means defining a plurality of elongated coking chambers constructed in side-by-side relation and each including sidewalls, an oven roof supported on said sidewalls, an oven floor for supporting a charge of coal to be coked in the chamber, and removable door means for opening and closing the chamber to permit charging the chamber with coal and discharging coke therefrom, a system of sole flues extending beneath each said oven floor, said sole flues being defined by refractory walls extending between said oven floor and a base slab spaced beneath the floor, downcomer means formed in said sidewalls and connecting the upper section of each said coking chamber with the sole flue system extending beneath the floor of the chamber, elongated substantially horizontal combustion tunnel means extending transversely of said plurality of ovens, chimney means connecting said sole flue system of each of said plurality of ovens with said combustion tunnel means whereby gases from the sole flue systems of said plurality of ovens are discharged into and combined in said combustion tunnel means, stack means extending above said ovens and said tunnel means and connected in fluid communication with said tunnel means to provide a draft from the upper section of each said coking chamber through a continuous flow path defined by said downcomer means, said sole flue systems, said chimney means, and said tunnel means through said stack means to the atmosphere, charging gas bypass means connected between the top of each said coking chamber and said combustion tunnel means through said roof providing a direct gas flow path from the coking chamber into said combustion tunnel means whereby charging gas may be drawn from the coking chamber directly into the combustion tunnel for mixture with and incineration by the hot gases from the sole flues of other ovens, and valve means connected in said bypass means, said valve means being operable to selectively open and close said direct gas flow path between the respective coking chambers and the combustion tunnel means.

2. The invention as defined in claim 1 wherein said downcomer means comprises a plurality of vertically extending downcomer flues formed in said sidewalls at spaced intervals along the length of said oven, each said downcomer flue having a gas inlet in the upper section of the coking chamber and a gas outlet in communication with said sole flue system.

3. The invention as defined in claim 1 wherein said sole flue system comprises a plurality of elongated flue tunnels extending longitudinally of each said oven in parallel relation to said sidewalls and to one another with adjacent tunnels being in fluid communication with one another at alternate ends thereof progressively across the transverse width of the oven to provide a continuous, back-and-forth flow pattern traversing and heating said oven floor throughout substantially the full length and width of the oven.

4. The invention as defined in claim 1 further comprising vent means for supplying combustion air into said bypass means, said vent means including valve means operable to control the flow of air into said bypass means.

5. The invention as defined in claim 1 wherein said valve means comprises a movable refractory plate mounted within said bypass means for movement between an open and a closed position, and power means for moving the plate between said positions.

6. The invention as defined in claim 1 further comprising tunnel vent means for admitting combustion air from the atmosphere into said combustion tunnel means, said tunnel vent means including valve means operable to control the flow of air into the combustion tunnel means.

7. The invention as defined in claim 6 further comprising,
a plurality of pipes embedded in and extending longitudinally through said base slab beneath each said oven, said pipes each having one end open to atmosphere at one end of the oven,
manifold means connecting the other end of at least selected ones of said pipes, and
conduit means including damper valve means connecting said manifold means to said sole flue system of each said oven for providing combustion air through said pipes to said sole flue system, the combustion air being preheated by waste heat absorbed from said base slab while passing through said pipes.

8. The invention as defined in claim 7 wherein said combustion tunnel means and said stack means are each supported on said sidewalls of said ovens and project upwardly therefrom intermediate the ends of said ovens.

9. A nonrecovery coke oven comprising,
means defining an elongated coking chamber including sidewalls, an oven roof supported on said sidewalls, an oven floor for supporting a charge of coal to be coked in the chamber, and removable door means for opening and closing the chamber to permit the discharge of coke therefrom,
a system of sole flues extending beneath said oven floor, said flues being defined by refractory walls extending between said oven floor and a base slab spaced beneath the floor,
downcomer means formed in said sidewalls and connecting the upper section of said coking chamber with the sole flue system extending beneath the floor of the chamber,
elongated substantially horizontal combustion tunnel means,
chimney means connecting said sole flue system with said combustion tunnel means,
stack means extending above said oven and said tunnel means and connected in fluid communication with said tunnel means to provide a draft from the upper section of said coking chamber through a continuous flow path defined by said downcomer means, said sole flue system, said chimney means, and said tunnel means through said stack means to the atmosphere, charging gas bypass means connected between the top of said coking chamber and said horizontal combustion tunnel means through said roof providing a direct gas flow path from the coking chamber into said combustion tunnel means,
valve means mounted in said bypass means, said valve means being operable to selectively open and close said gas flow path,
a plurality of pipes embedded in and extending longitudinally of the ovens through said base slab, said pipes each having one end open to atmosphere at one end of the oven,
manifold means connecting the other end of at least selected ones of said pipes,
conduit means including damper valve means connecting said manifold means to said sole flue system for providing combustion air through said pipes to said sole flue system, the combustion air being preheated by waste heat absorbed from said base slab while passing through said pipes,
a plurality of support beams extending longitudinally of said oven in parallel spaced relation to one another and supporting said base slab, said sole flue system, and said ovens, and
foundation means supporting said longitudinally extending beams, the space between adjacent beams being open to the atmosphere at opposed ends of the oven to avoid excessive heat transfer to the foundation means.

10. A nonrecovery coke oven comprising,
means defining an elongated coking chamber including sidewalls, an oven roof supported on said sidewalls, an oven floor for supporting a charge of coal to be coked in the chamber, and removable door means for opening and closing the chamber to permit the discharge of coke therefrom,
a system of sole flues extending beneath said oven floor, said sole flue system including two separate arrays of sole flues each including a plurality of elongated flue tunnels extending longitudinally of said oven in generally parallel relation to said sidewalls and to one another with adjacent tunnels being in fluid communication with one another at alternate ends thereof progressively across the transverse width of the oven to provide a continuous, back-and-forth flow pattern traversing and heating said oven floor throughout substantially the full length and width of the oven, said sole flues being defined by refractory walls extending between said oven floor and a base slab spaced beneath the floor, said arrays being separated by transversely extending wall means,
downcomer means formed in said sidewalls and connecting the upper section of said coking chamber with the sole flue system extending beneath the floor of the chamber,
elongated substantially horizontal combustion tunnel means,
chimney means connecting said sole flue system with said combustion tunnel means,
stack means extending above said oven and said tunnel means and connected in fluid communication with said tunnel means to provide a draft from the upper section of said coking chamber through a continuous flow path defined by said downcomer means, said sole flue system, said chimney means, and said tunnel means through said stack means to the atmosphere, charging gas bypass means connected between the top of said coking chamber and said horizontal combustion tunnel means through said roof providing a direct gas flow path from the coking chamber into said combustion tunnel means, and valve means mounted in said bypass means, said valve means being operable to selectively open and close said gas flow path.

11. The invention as defined in claim 10 further comprising, a plurality of pipes embedded in and extending longitudinally of the ovens through said base slab, said pipes each having one end open to atmosphere at one end of the oven, manifold means connecting the other end of at least selected ones of said pipes, and conduit means including damper valve means connecting said manifold means to said sole flue system for providing combustion air through said pipes to said sole flue system, the combustion air being preheated by waste heat absorbed from said base slab while passing through said pipes.

12. The invention as defined in claim 10 wherein said downcomer means and said chimney means are connected to sole flue tunnels in each of said separate sole flue arrays to provide a flow path in opposite directions progressively across the opposite ends of the oven, said downcomer means and said chimney means connected to sole flue tunnels in the respective sole flue arrays being constructed in opposed sidewalls of the oven.

13. The invention as defined in claim 12 further comprising vent means for admitting combustion air into the sole flue tunnels of each said sole flue array.

14. A nonrecovery coke oven battery comprising, in combination, a plurality of elongated ovens constructed as a unit in side-by-side relation, each said oven in the unit including a coking chamber defined by sidewalls, an oven roof supported on said sidewalls, a floor for supporting a charge of coal to be coked in the chamber, removable door means for opening and closing the chamber to permit the discharge of coke therefrom, and a base slab extending beneath the floor in spaced relation thereto, an independent sole flue system between said floor and said base slab of each said oven, each said sole flue system including two separate arrays of sole flues each including a plurality of elongated flue tunnels extending longitudinally of the ovens in parallel relation to said sidewalls and to one another, one at each end portion of the oven, with adjacent tunnels being connected at alternate ends thereof progressively across the width of the oven to provide a continuous back-and-forth flow pattern traversing and heating said floor throughout substantially the full width of the oven, said separate arrays being separated by transversely extending wall means, downcomer means formed in said sidewalls and connecting the upper portion of each said coking chamber with the sole flue system extending beneath said floor of the respective coking chambers, elongated horizontally extending combustion tunnel means constructed of a heat-resistant material and providing a common combustion tunnel extending transversely of said plurality of ovens above said coking chambers, chimney means extending upwardly through said sidewalls and separately connecting said sole flue system beneath each said oven with said common combustion tunnel, and, stack means extending above said ovens and said combustion tunnel means and having its base connected in fluid communication with said combustion tunnel means to simultaneously provide a draft from the coking chambers of each of said plurality of ovens through a continuous flow path defined by said downcomers, said sole flue systems, said chimney means, and said common combustion tunnel through said stack means to the atmosphere.

15. The invention as defined in claim 14 wherein said downcomer means comprises a plurality of vertically extending downcomer flues formed in said sidewalls at spaced intervals along the length of said oven, each said downcomer flue having a gas inlet in the upper section of the coking chamber and a gas outlet in communication with said sole flue system.

16. The invention as defined in claim 15 wherein said downcomer means and said chimney means are connected to sole flue tunnels in each of said separate sole flue arrays to provide a flow path in opposite directions progressively across the opposite ends of the oven, said downcomer means and said chimney means connected to sole flue tunnels in the respective sole flue arrays being constructed in opposed sidewalls of the oven.

17. The invention as defined in claim 16 further comprising charging gas bypass means connected directly between the top of said coking chambers of each of said plurality of ovens to said common combustion tunnel through the roof of said ovens to provide a direct gas flow path from the respective coking chambers into the common combustion tunnel, and valve means mounted in said bypass means, said valve means being operable to selectively open and close said gas flow path from the respective coking chambers into said common tunnel.

18. The invention as defined in claim 17 further comprising vent means for supplying combustion air into said bypass means, said vent means including valve means operable to control the flow of air into said bypass means.

19. The invention as defined in claim 18 wherein said valve means comprises a movable refractory plate mounted within said bypass means for movement between an open and a closed position, and power means for moving the plate between said open and closed positions.

20. The invention as defined in claim 19 further comprising, a plurality of pipes embedded in and extending longitudinally through said base slab, said pipes each having one end open to atmosphere at one end of the oven, manifold means connecting the other end of at least selected ones of said pipes, and conduit means including damper valve means connecting said manifold means to said sole flue system for providing combustion air through said pipes to said sole flue system, the combustion air being preheated by waste heat absorbed from said base slab while passing through said pipes.

21. The invention as defined in claim 20 wherein said combustion tunnel means and said stack means are each supported on said sidewalls of said ovens and project upwardly therefrom intermediate the ends of said ovens.

22. A nonrecovery coke oven battery comprising, in combination, a plurality of elongated ovens constructed as a unit in side-by-side relation, each said oven in the unit including a coking chamber defined by sidewalls, an oven roof supported on said sidewalls, a floor for supporting a charge of coal to be coked in the chamber, removable door means for opening and closing the chamber to permit the discharge of coke therefrom, and a base slab extending beneath the floor in spaced relation thereto, an independent sole flue system between said floor and said base slab of each said oven, each said sole flue system including a plurality of elongated flue tunnels extending longitudinally of the ovens in parallel relation to said sidewalls and to one another with adjacent tunnels being connected at alternate ends thereof progressively across the width of the oven to provide a continuous back-and-forth flow pattern traversing and heating said floor throughout substantially the full width of the oven, downcomer means formed in said sidewalls and connecting the upper portion of each said coking chamber with the sole flue system extending beneath said floor of the respective coking chambers, elongated horizontally extending combustion tunnel means constructed of a heat-resistant material and providing a common combustion tunnel extending transversely of said plurality of ovens above said coking chambers, chimney means extending upwardly through said sidewalls and separately connecting said sole flue system beneath each said oven with said common combustion tunnel, stack means extending above said ovens and said combustion tunnel means and having its base connected in fluid communication with said combustion tunnel means to simultaneously provide a draft from the coking chambers of each of said plurality of ovens through a continuous flow path defined by said downcomer means, said sole flue systems, said chimney means, and said common combustion tunnel through said stack means to the atmosphere, a plurality of support beams extending longitudinally of said oven in parallel spaced relation to one another and supporting said base slab, said sole flue system, and said ovens, and foundation means supporting said longitudinally extending beams, the space between adjacent beams being open to the atmosphere at opposed ends of the oven to permit the circulation of air beneath said base slab to avoid excessive heat transfer to the foundation means.

23. The invention as defined in claim 22 wherein said unit comprises at least three ovens constructed in side-by-side relation.

24. The invention as defined in claim 23 wherein said coke oven battery comprises a plurality of said coke oven units constructed in side-by-side relation, each said unit consisting of at least three of said ovens each, said ovens each further comprising charging gas bypass means connected directly between the top of said coking chambers of each of said plurality of ovens and said common combustion tunnel through the roof of said ovens to provide a direct gas flow path from the respective coking chambers into the common combustion tunnel, and valve means mounted in said bypass means, said valve means being operable to selectively open and close said gas flow path from the respective coking chambers into said common tunnel.

25. The invention as defined in claim 24 wherein said units each comprise at least six of said ovens, and wherein said stack means comprises a vertically extending stack supported on a sidewall of one of said ovens and having its base connected to said combustion tunnel means traversing the ovens in the unit at a point intermediate the ends of the said combustion tunnel means with at least three said ovens having their chimney means connected to said combustion tunnel means on each side of the stack.

26. In a nonrecovery coke oven including an elongated coking chamber having open ends and being defined by opposed, upwardly extending sidewalls, a substantially continuous roof supported on the sidewalls, a floor for supporting a charge of coal to be coked in the chamber, removable doors for opening and closing the open ends of the chamber to permit the pushing of coke from one end of the chamber and the charging of coal into the chamber from the other end, a system of sole flues extending beneath the oven floor, the flues being defined by refractory walls extending between the oven floor and a base slab spaced below the floor and means for supplying combustion air to the sole flue system, and improvement comprising, combustion air preheating and base slab cooling means including a plurality of pipes embedded in and extending longitudinally of the oven through the base slab, the pipes each having one end open to atmosphere at one end of the oven, manifold means connecting the other end of at least selected ones of said pipes, conduit means including flow control valve means connecting said manifold means to said sole flue system for providing combustion air through said pipes to said sole flue system whereby the combustion air is preheated by waste heat absorbed from the base slab while passing through said pipes and the base slab is simultaneously cooled to thereby substantially reduce the amount of heat which penetrates through the base slab, a plurality of support beams extending longitudinally of said oven in parallel spaced relation to one another and supporting said base slab, said sole flue system, and said oven, and foundation means extending beneath and supporting said longitudinally extending beams along substantially their full length, the space between adjacent beams being open to the atmosphere at the opposed ends of the oven to permit circulation of air beneath said base slab to thereby further limit penetration of heat through the base slab to the foundation means.

27. A nonrecovery coke oven battery comprising, in combination, a plurality of elongated ovens constructed as a unit in side-by-side relation, each said oven in the unit including a coking chamber defined by sidewalls, an oven roof supported on said sidewalls, a floor for supporting a charge of coal to be coked in the chamber, removable door means for opening and closing each end of the coking chamber to permit charging the coking chamber with coal and discharging coke therefrom, and a base slab extending beneath the floor in spaced relation thereto, an independent sole flue system between said floor and said base slab of each said oven, each said sole flue system including a plurality of elongated flue tunnels extending longitudinally of the ovens in parallel relation to said sidewalls and to one another with adjacent tunnels being connnected at alternate ends thereof progressively across the width of the oven to provide a continuous back-and-forth flow pattern traversing and heating said floor throughout substantially the full width of the oven, downcomer means formed in said sidewalls and connecting the upper portion of each said coking chamber with the sole flue system extending beneath said floor of the respective coking chambers, elongated horizontally extending combustion tunnel means constructed of a heat-resistant material and providing a common combustion tunnel extending transversely of said plurality of ovens above the roofs of said coking chambers, chimney means extending upwardly through said sidewalls and separately connecting each said sole flue system with said common combustion tunnel, each adjacent pair of coking chambers in the battery including a common sidewall having both chimney means and downcomer means formed therein, and stack means supported on said ovens and extending above said combustion tunnel means, said stack means having its base connected in fluid communication with said combustion tunnel means to simultaneously provide a draft from the coking chambers of each of said plurality of ovens through a continuous flow path defined by said downcomer means, said sole flue systems, said chimney means, and said common combustion tunnel means through said stack means to the atmosphere.

28. The invention as defined in claim 27 further comprising, a plurality of pipes embedded in and extending longitudinally through said base slab, said pipes each having one end open to atmosphere at one end of the oven, manifold means connecting the other end of at least selected ones of said pipes, and conduit means including damper valve means connecting said manifold means to said sole flue system for providing combustion air through.said pipes to said sole flue system, the combustion air being preheated by waste heat absorbed from said base slab while passing through said pipes.

29. The invention as defined in claim 27 further comprising charging gas bypass means connected directly between the top of said coking chamber of each of said plurality of ovens and said common combustion tunnel through the roof of said ovens to provide a direct gas flow path from the respective coking chambers into the common combustion tunnel, and valve means mounted in said bypass means, said valve means being operable to selectively open and close said gas flow path from the respective coking chambers into said common tunnel.

30. The invention as defined in claim 29 further comprising, a plurality of pipes embedded in and extending longitudinally through said base slab, said pipes each having one end open to atmosphere at one end of the oven, manifold means connecting the other end of at least selected ones of said pipes, and conduit means including damper valve means connecting said manifold means to said sole flue system for providing combustion air through said pipes to said sole flue system, the combustion air being preheated by waste heat absorbed from said base slab while passing through said pipes.

31. The invention as defined in claim 30 wherein said combustion tunnel means and said stack means are each supported on said sidewalls of said ovens and project upwardly therefrom intermediate the ends of said ovens.

32. A non-recovery coke oven battery comprising, in combination, a plurality of elongated coking ovens constructed in side-by-side relation with adjacent ovens being separated by common upwardly extending sidewalls, each said oven including an elongated coking chamber having open ends and being defined by said upwardly extending sidewalls, a substantially continuous roof supported on said sidewalls, a floor for supporting a charge of coal to be coked in the chamber, and removable door means for opening and closing the open ends of the chamber to permit the pushing of coke from one end of the chamber and the charging of coal into the chamber from the other end thereof, an independent sole flue system beneath said floor of each said oven, each said sole flue system including a plurality of elongated flue tunnels extending longitudinally of the oven in parallel relation to said sidewalls and to one another with adjacent tunnels being connected at alternate ends thereof progressively across the transverse dimension of the oven to provide a continuous back-and-forth flow pattern traversing the floor substantially throughout the entire width of the oven, downcomer means formed in said sidewalls and connecting the upper portion of each coking chamber with the sole flue system extending beneath the floor of that chamber, a plurality of stacks each supported on selected ones of said sidewalls and extending upwardly therefrom at spaced intervals along the length of the battery, the spacing of said stacks being such as to include at least six ovens between adjacent stacks in the battery, an elongated substantially horizontal combustion tunnel constructed of heat-resistant material and extending transversely of said ovens throughout substantially the full length of said battery, said tunnel being connected to the base of each of said stacks, said stacks dividing said tunnel into a plurality of elongated tunnel segments each being connected into the base of at least one of said stacks and extending transversely across a plurality of ovens, chimney means extending upwardly through said sidewalls and separately connecting the sole flue system beneath each said oven with said tunnel segment extending thereabove, each said stack providing a draft through the tunnel segments connected in its base to the coking chambers of each of the ovens beneath the connected tunnel segment through said chimney means, said sole flue system, and said downcomer means to the upper portion of said coking chambers, charging gas bypass means connected directly between the crown portion of each of said coking chambers and the tunnel segment extending thereabove, said bypass means including an opening through the oven roof to provide a direct gas flow path from the respective coking chambers into the connected tunnel segment, and valve means mounted in each said bypass means, said valve means being operable to selectively open and close said direct gas flow path from the respective coking chambers into the connected tunnel segment.

33. The invention as defined in claim 32 further comprising first vent means for supplying combustion air into said sole flue tunnel system, second vent means for supplying combustion air into said tunnel segments, and third vent means for supplying combustion air into each of said bypass means, each said vent means including valve means operable to control the flow of air therethrough.

34. A nonrecovery coke oven comprising, an elongated coking chamber defined by sidewalls, an oven roof supported on said sidewalls, a floor for supporting a charge of coal to be coked in the chamber, and removable door means for opening and closing each end of the coking chamber to permit charging the coking chamber with coal and discharging coke therefrom, a sole flue system extending beneath said floor, throughout substantially the full length and width of the oven chamber, said sole flue system including two separate arrays of sole flues one extending beneath each end portion of the floor and each including a plurality of elongated flue tunnels extending longitudinally of the oven in parallel relation to said sidewalls and to one another with adjacent tunnels being connected at alternate ends thereof progressively across the width of the oven to provide two continuous back-and-forth flow patterns one at each end of the oven cooperating to heat said floor throughout substantially the full width and length of the oven, downcomer means formed in said sidewalls and connecting the crown portion of said coking chamber with the sole flue arrays extending beneath each end of said floor, separate chimney means connected with each said array of sole flues beneath each end of said oven, and stack means extending above said ovens having its base connected in fluid communication with said chimney means connected with each array of sole flues to simultaneously provide a draft from the coking chambers of said oven through a continuous flow path including said downcomer means, said sole flue arrays, and said chimney means through said stack means to the atmosphere.

35. The invention as defined in claim 34 wherein such downcomer means and said chimney means are connected to said sole flue array to provide a flow path traversing said oven from opposite side walls at opposite ends of the oven.

36. The invention as defined in claim 35 further comprising a horizontally-extending combustion tunnel extending above said coking chamber and connected between said chimney means and said stack means whereby said continuous flow path extends through said combustion tunnel.

* * * * *